(12) United States Patent
Bertram et al.

(10) Patent No.: US 9,952,750 B2
(45) Date of Patent: Apr. 24, 2018

(54) MANAGING A DROP-DOWN MENU HAVING A SET OF ITEMS CORRESPONDING WITH A SET OF DATA

(71) Applicant: International Business Machines Corporation, Armonk, NY (US)

(72) Inventors: Randal L. Bertram, Raleigh, NC (US); Gregory R. Hintermeister, Rochester, MN (US); David M. S. Niedergeses, Rochester, MN (US); Hai Feng Yao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 14/179,924

(22) Filed: Feb. 13, 2014

(65) Prior Publication Data

US 2015/0227568 A1 Aug. 13, 2015

(51) Int. Cl.
*G06F 3/00* (2006.01)
*G06F 3/0484* (2013.01)
*G06F 3/0482* (2013.01)
*G06F 9/44* (2018.01)

(52) U.S. Cl.
CPC ........ *G06F 3/04842* (2013.01); *G06F 3/0482* (2013.01); *G06F 9/44* (2013.01); *G06F 9/4443* (2013.01)

(58) Field of Classification Search
CPC .......................... H04N 5/44543; G06F 9/4443
USPC ......................................... 715/810, 824, 825
See application file for complete search history.

(56) References Cited

U.S. PATENT DOCUMENTS

| 6,121,968 A * | 9/2000 | Arcuri ................... G06F 3/0482 715/825 |
| 7,590,696 B1 * | 9/2009 | Odell ................... G06Q 10/107 455/466 |
| 7,719,542 B1 | 5/2010 | Gough et al. |
| 7,856,602 B2 | 12/2010 | Armstrong |
| 7,913,186 B2 * | 3/2011 | Becker ................ G06F 3/0482 715/788 |
| 8,436,715 B2 | 5/2013 | Elgort et al. |
| 8,805,816 B2 * | 8/2014 | Kimball ............... G06F 3/0481 707/710 |
| 2004/0059781 A1 * | 3/2004 | Yoakum ................ H04L 29/06 709/204 |
| 2004/0080545 A1 | 4/2004 | Kobal et al. |
| 2005/0125744 A1 * | 6/2005 | Hubbard ............... G06F 3/0482 715/824 |
| 2012/0254801 A1 | 10/2012 | Gaffney et al. |
| 2014/0026099 A1 * | 1/2014 | Andersson Reimer .................... G06F 3/0482 715/825 |
| 2015/0007090 A1 * | 1/2015 | Bissantz ............... G06F 3/0488 715/774 |

* cited by examiner

Primary Examiner — Joy M Weber
(74) Attorney, Agent, or Firm — Jay Wahlquist (57) ABSTRACT

A computer implemented method for managing a widget is disclosed. The widget can include a drop-down menu. The method can include opening the drop-down menu having a set of items corresponding with a set of data. The method can also include updating the set of items dynamically in the opened drop-down menu in response to a change in the set of data. The method can also include processing a selected item from the updated set of items in the opened drop-down menu.

20 Claims, 7 Drawing Sheets

MANAGING A DROP-DOWN MENU HAVING A SET OF ITEMS CORRESPONDING WITH A SET OF DATA

This disclosure relates to systems and methods for managing computer system user interface controls. In particular, it relates to a computer implemented widget.

BACKGROUND

Selecting an item from a list of options is a common function of software user interfaces. One user interface tool that can facilitate management of items in a list is the drop-down menu. As the number of items available for selection in software user interfaces increases, the need for managing these items may also increase.

SUMMARY

Aspects of the present disclosure, in certain embodiments, are directed toward a method and system for managing a computer-implemented widget. In certain embodiments, the computer-implemented widget can be a drop-down menu. In certain embodiments, the method can include opening the drop-down menu having a set of items corresponding with a set of data. The method can also include dynamically updating the set of items in the opened drop-down menu in response to a change in the set of data. In certain embodiments, the method can include processing, from the updated set of items, a selected item in the opened drop-down menu.

Aspects of the present disclosure, in certain embodiments, are directed toward a computer implemented method for managing a widget. In certain embodiments, the method can include opening a widget. The widget may have a set of items corresponding with a set of data. The set of items can include a first item and a second item. Each of the first and second items may be configured to have a first state and a second state. The set of data can also include a first component and a second component configured to have a first condition and a second condition. In certain embodiments, the first state of the first item can correspond to the first condition of the first component, and the second state of the first item can correspond to the second condition of the first component. In certain embodiments, the first state of the second item can correspond to the first condition of the second component, and the second state of the second item can correspond to the second condition of the second component. The method can also include updating the set of items dynamically in the opened widget in response to a change in the set of data. Updating the set of items can include a first transition, wherein the first component converts from the second condition to the first condition, the first item converts from the second state to the first state, and the first item is provided in the updated set of items. In certain embodiments, the first condition can represent an accessible condition, and the first state can represent a valid state. Updating the set of items can further include a second transition, wherein the second component converts from the first condition to the second condition, the second item converts from the first state to the second state, and the second item is not provided in the set of items. In certain embodiments, the second condition can represent an at least partially inaccessible condition, and the first state can represent an invalid state. The method can also include processing, from the updated set of items, a selected item in the opened widget.

Aspects of the present disclosure, in certain embodiments, are directed toward a system for managing a widget for a drop-down menu. In certain embodiments, the system can include an opening module configured to open the drop-down menu having a set of items corresponding with a set of data. The system can also include an updating module configured to update the set of items dynamically in the opened drop-down menu in response to a change in the set of data. In certain embodiments, the method can include a processing module configured to process a selected item from the updated set of items in the opened drop-down menu.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments of the invention and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to various embodiments of a system and methodology for managing a computer-implemented widget. An example of a computer-implemented widget can be a drop-down menu. The methodology can include opening a drop-down menu having a set of items corresponding with a set of data. The set of items in the drop down menu can be dynamically updated in response to a change in the set of data while the menu is displayed. The methodology may process a selected item from the updated set of items in the opened drop-down menu. The methodology may facilitate operation of the drop-down menu in different modes.

Selecting at least one item from a list of choices is a function of software user interfaces. A variety of software tools and widgets exist to facilitate management of data and software functionality. Drop-down menus are one common tool for providing a user with a list of choices, and can provide benefits associated with efficient space allocation and ease of use. However, aspects of the present disclosure relate to the recognition that, in certain situations, the list of items in a drop-down menu is not updated in real time. This can lead to challenges in dynamic environments such as system management, where the valid choices are often rapidly changing. Accordingly, aspects of the present disclosure relate to a method and system for a drop-down menu that can facilitate dynamic real-time updates to the items in the menu while the menu is open, and can operate in multiple modes depending on the needs and application of the drop-down menu. The present disclosure may provide benefits associated with efficient menu management, faster menu updates, fewer errors, and space efficiency.

Aspects of the present disclosure include a method and system for managing a computer-implemented widget. The method and system may work on a number of devices and operating systems. The computer-implemented widget can be one of a number of various designs, including context menus, pull-down menus, tables, and other types of user interface controls. For example, in certain embodiments, the computer-implemented widget can include a drop-down menu. Where reference is made herein to a drop-down menu, it should be understood that this is not meant to be limiting, and other types of menus, tables, and user interface controls are also contemplated (e.g., a pop-up menu).

The method and system can include opening a drop-down menu having a set of items corresponding with a set of data. The set of items can include first and second items configured to have first and second states. For example, the first state could be a valid state, and the second state could be an invalid state. The set of data may include first and second components configured to have first and second conditions. For example, the first condition may be an accessible condition, and the second condition may be an at least partially inaccessible condition. The first and second states of the first item can correspond to the first and second conditions of the first component, respectively. Additionally, the first and second states of the second item can correspond to the first and second conditions of the second component, respectively. For example, the valid state of the first item can correspond to the accessible condition of the first component. As an additional example, the invalid state of the second item can correspond to the at least partially inaccessible condition of the second component.

Aspects of the present disclosure can include dynamically updating the set of items in the drop-down menu in response to a change in the set of data. Updating the set of items can include a first transition, in which the first component converts from the second condition to the first condition, and the first item converts from the second state to the first state. For example, the first component can convert from an at least partially inaccessible condition to an accessible condition, and the first item can convert from an invalid state to a valid state. Additionally, updating the set of items can include a second transition, in which the second component converts from the first condition to the second condition, and the second item converts from the first state to the second state. For example, the second component can convert from an accessible condition to an at least partially inaccessible condition, and the second item can convert from a valid state to an invalid state.

Aspects of the present disclosure can include processing a selected item from the updated set of items in the opened drop-down menu. Processing can include performing an operation related to a data component corresponding to the selected item. Further, processing can include choosing a data component corresponding to the selected item as the target of an operation. For example, a data component could represent a computer system, and processing could include selecting the item corresponding to the computer system in order to initiate a system update for the computer system.

Aspects of the present disclosure are directed toward a system and method for managing a drop-down menu configured to operate in a first mode. In the first mode, the drop-down menu can be configured to provide a valid subset of a set of items in response to opening the drop-down-menu. Further, the method can include adding, in response to a first transition, a first item associated with the valid subset to the drop-down menu, and removing, in response to a second transition, a second item associated with an invalid subset from the drop-down menu. The first item may be tagged with a data label having information regarding the first state change.

Aspects of the present disclosure are directed toward a system and method for managing a drop-down menu configured to operate in a second mode. In the second mode, the drop-down menu can be configured to provide a valid subset of a set of items in response to opening the drop-down menu. Further, the method can include adding, in response to a first transition, a first item associated with the valid subset to the drop-down menu, and disabling, in response to a second transition, a second item of the drop-down menu. The second item may be associated with an invalid subset of the set of items. Disabling can include marking the second item with an indicator.

Aspects of the present disclosure are directed toward a system and method for managing a drop-down menu configured to operate in a third mode. In the third mode, the drop-down menu can be configured to provide a valid subset of a set of items and an invalid subset of the set of items in response to opening the drop-down menu. Further, the method can include enabling, in response to a first transition, a first item of the drop-down menu, and disabling, in response to a second transition, a second item of the drop-down menu. The first item can be associated with the valid subset, and the second item can be associated with the invalid subset. Additionally, the method can include marking the first item with a first data label and a first indicator in response to the first transition. The first data can include information related to the first transition. The method can also include marking the second item with a second data label and a second indicator in response to the second transition. The second data label can include information related to the second transition. Aspects of the present disclosure provide a methodology for managing a drop-down menu that may have positive effects associated with increased ease of use and efficiency.

Figure 1:
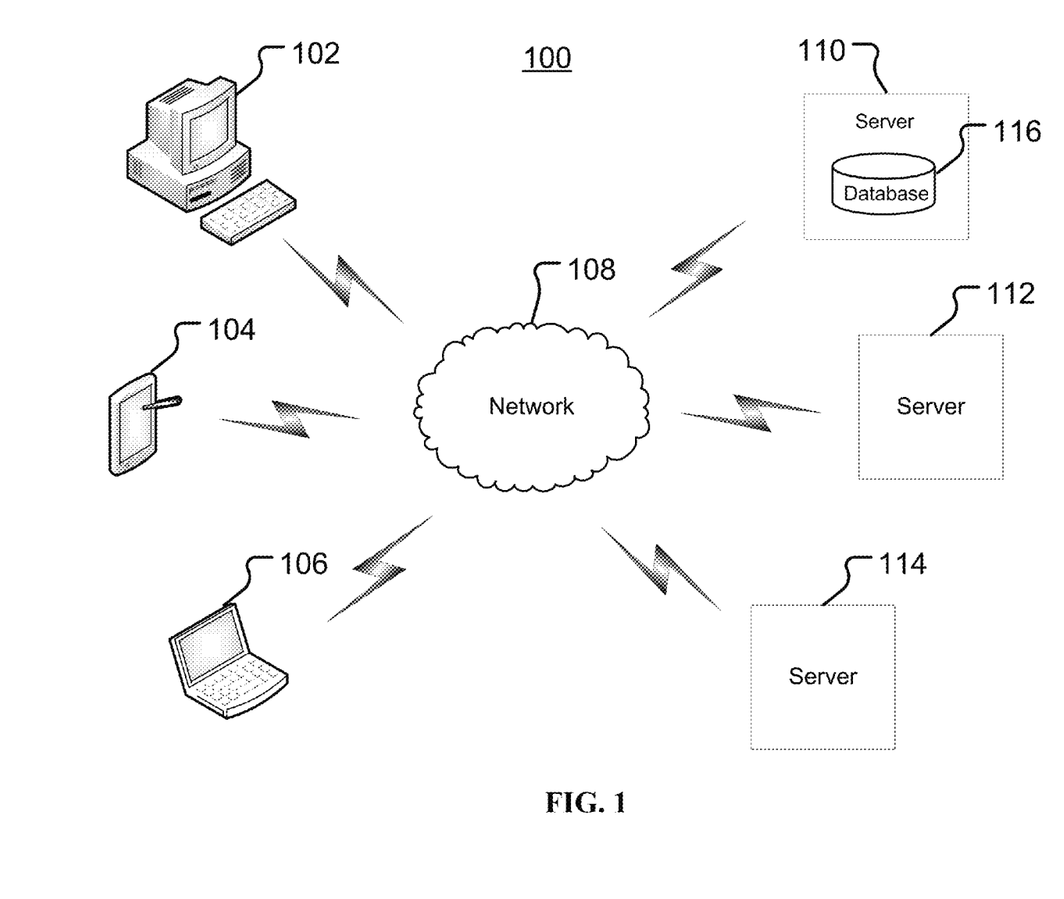
FIG. 1 illustrates a high-level example of a network architecture, according to embodiments.

Turning now to the figures, FIG. 1 illustrates a high-level example of a network architecture 100, consistent with embodiments of the present disclosure. Aspects of FIG. 1 are directed toward a network architecture that facilitates the implementation of an application for managing a drop-down menu. The network architecture 100 is presented to show one example of an environment where a system and method in accordance with the present disclosure may be implemented. The network architecture 100 is presented only by way of example and is not intended to be limiting. The system and methods disclosed herein may be applicable to a wide variety of different computers, servers, storage devices, and network architectures, in addition to the network architecture 100 shown.

As shown in FIG. 1, the network architecture 100 can include one or more host devices 102, 104, 106 interconnected by a network 108. The host devices can include computers, tablets, Personal Digital Assistants (PDAs), smartphones, and other devices. The network 108 can include, for instance, a local-area-network (LAN), a wide-area network (WAN), the Internet, an intranet, or the like (and various combinations thereof). Consistent with various embodiments, the network architecture 100 can also include one or more server computers 110, 112, 114 (alternately referred to as "remote systems" or "remote devices"). In certain embodiments, host devices 102 can initiate communication sessions, whereas remote devices 110 can wait for requests from the host devices 102.

Consistent with various embodiments, the remote devices 110 may maintain information and databases for access by host devices 102. Aspects of the present disclosure are directed toward a drop-down menu management system that can operate on one or more host devices 102 and can access a database 116 of one or more remote devices 110. The database 116 can maintain a set of data accessible by the host devices 102 over the network 108. For example, in certain embodiments, the set of data could be status information regarding the condition of one or more data components. The drop-down menu management system can be linked to the set of data on the database 116, and can update a set of menu items in a drop-down menu in response to a change in the condition of one or more of the data components.

Figure 2:
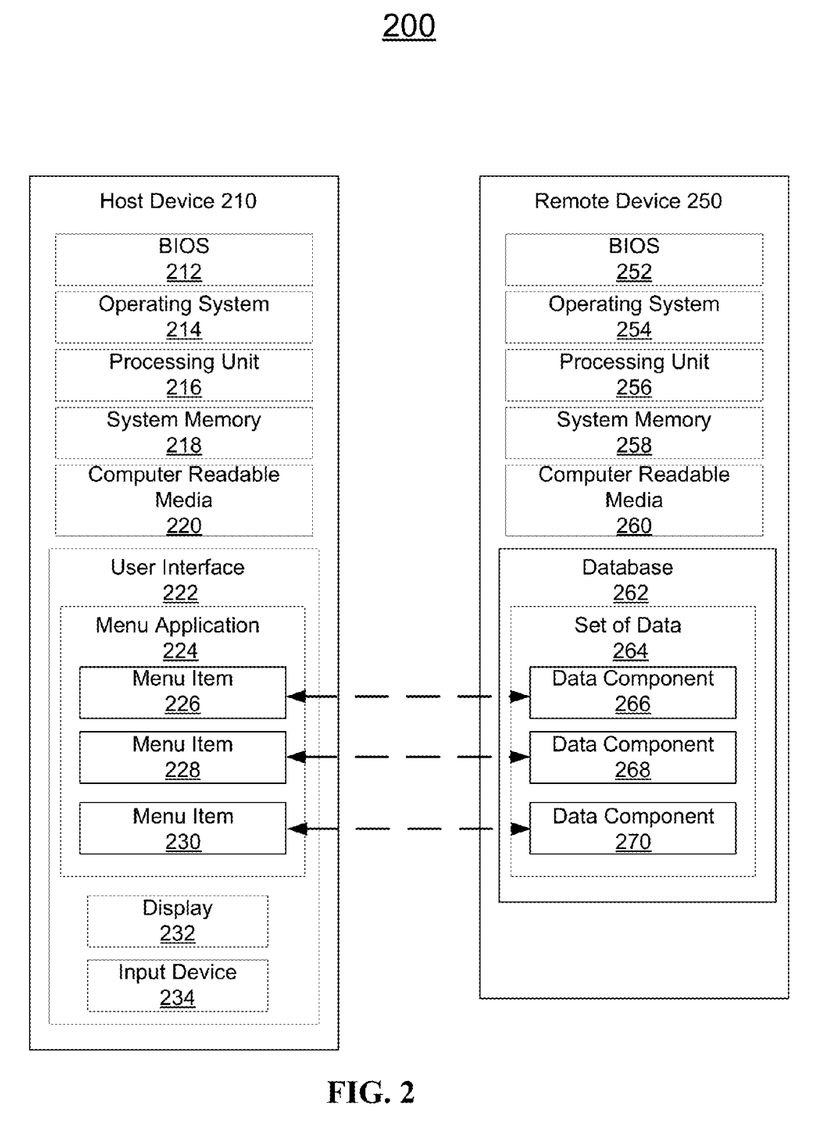
FIG. 2 illustrates an example system architecture for a dynamic menu managing system, according to embodiments.

FIG. 2 illustrates an example network architecture 200 for a system to manage a drop-down menu, consistent with embodiments of the present disclosure. Aspects of FIG. 2 are directed toward a network architecture 200 that facilitates the implementation of a method for managing a search. Consistent with various embodiments, the network architecture can include a host device 210 and a remote device 250. In certain embodiments, the host device 210 and the remote device 250 can be communicatively connected via a network. Other communication solutions between the host device 210 and the remote device 250 are also possible.

Consistent with embodiments of the present disclosure, the network architecture 200 can include a host device 210 and a remote device 250. Both the host device 210 and the remote device 250 can include a BIOS (basic input-output system) 212, 252 an operating system 214, 254 one or more processors or processing units 216, 256 a system memory 218, 258 and some form of computer-readable media 220, 260.

As shown in FIG. 2, the host device 210 can include one or more forms of computer readable media 220. For example, computer readable media can include storage media, such as random-access memory (RAM), read-only memory (ROM), electrically erasable programmable read-only memory (EEPROM), flash memory, hard disks, optical disk storage, or other mediums that can be used to store information that can be accessed by the host device 210. Additionally, computer-readable media can include communication media, such as computer-readable instructions, data structures, and program modules. Wired media, such as a wired network or a direct-wired connection, and wireless media, such as acoustic, radio frequency, infrared and other wireless media are further examples of communication media. Combinations of the above are also included within the scope of computer-readable media.

In certain embodiments, the host device 210 can include a BIOS 212 an operating system 214 accessible by the system memory 218. The BIOS 212 and the operating system 214 can facilitate the transfer of information between elements within the host device 210, as well as the implementation of application programs and other program modules. A user interface 222 can also be linked to the host device 210 that allows a user to interact with the application programs and program modules of the host device 210. For example, the user interface 222 can include a display 232 such as a computer monitor, and one or more input devices 234 such as a keyboard or a pointing device (e.g., a mouse, trackball, pen, or touch pad.)

In certain embodiments, the remote device 250 can include a database 262. The database can maintain a set of data 264. As shown in FIG. 2, the set of data 264 can include one or more data components 266, 268, 270. Each data component can be configured to have a first condition and a second condition. For example, the first condition can be an accessible condition, and the second condition can be an at least partially inaccessible condition. Consistent with various embodiments, when a data component is in an accessible condition, it can be selected to be utilized as part of one or more task operations, and when a data component is in an at least partially inaccessible condition, it can be prevented from being utilized as part of a task operation. Further, in certain embodiments, the data components may represent devices, systems, or other entities within a network. As an example, in certain embodiments, the data components could represent one or more computer systems of a network. For instance, data component 266 could be in the accessible condition to indicate that the computer system it represented was online in the network, and available to perform a task. Similarly, data component 268 could be in the at least partially inaccessible condition to indicate that the computer system it represented was not online in the network, and was not available to perform a task. Other scenarios and uses of the data components are also possible. Further, although FIG. 2 depicts three data components for simplicity, other numbers of data components are also possible.

Consistent with various embodiments, the user interface 222 can include a menu application 224. The menu application 224 can be executable by the host device 210, and can be responsive to user input data for managing items within the menu application 224. As shown in FIG. 2, the menu application may include one or more menu items 226, 228, and 230. Each menu item can be configured to have a first state and a second state. For example, the first state can be a valid state, and the second state can be an invalid state. Consistent with various embodiments, each menu item of the host device 210 can correspond with a data component of the set of data 264. For example, menu item 226 can correspond to data component 266, menu item 228 can correspond to data component 268, and menu item 230 can correspond to data component 270. Further, the valid state of a particular menu item can correspond to the accessible condition of a particular data component, and the invalid state of the particular menu item can correspond to the at least partially inaccessible condition of the particular data component. For example, menu item 230 can be in the valid state when data component 270 is in an accessible condition (e.g., a computer system connected to a network and available), and in the invalid state when data component 270 is in the at least partially inaccessible condition (e.g., a computer system not connected to a network and unavailable).

Figure 3:
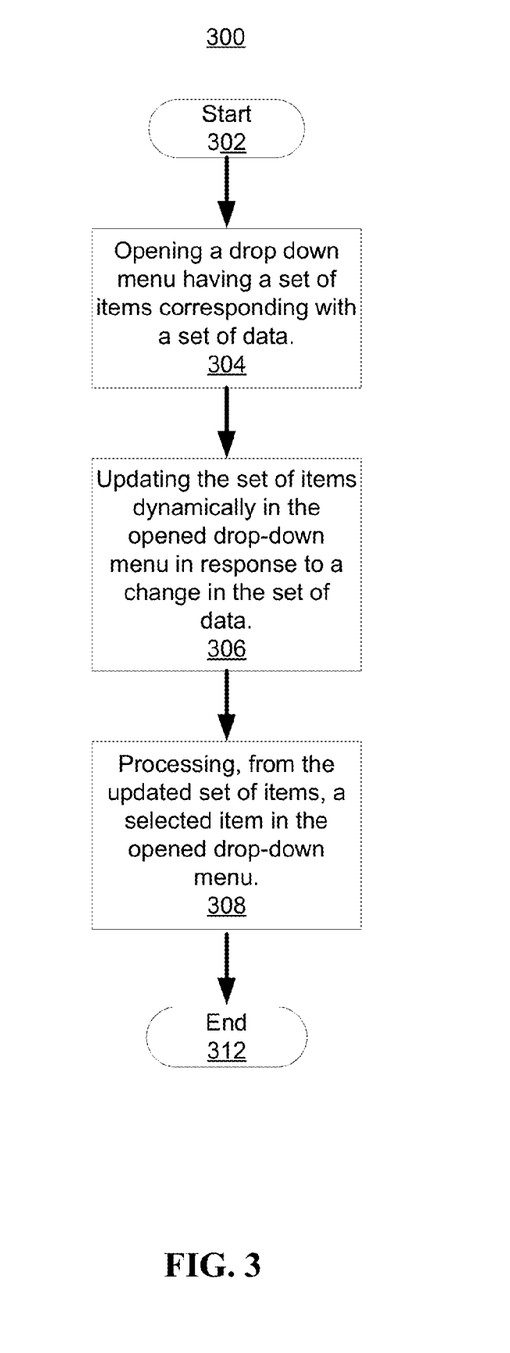
FIG. 3 is a flowchart illustrating a method for managing a drop-down menu, according to embodiments.

FIG. 3 is a flowchart illustrating a method for managing a drop-down menu, consistent with embodiments of the present disclosure. Aspects of FIG. 3 are directed toward processing a selected item from an updated set of items in an open drop-down menu. The method 300 may begin at block 302 and end at block 312. Consistent with various embodiments, the method can include an opening block 304, an updating block 306, and a processing block 308.

Consistent with various embodiments, at block 304 the method 300 can include opening a drop-down menu having a set of items (also referred to herein as menu items) corresponding with a set of data. Opening the drop-down menu can include displaying the drop-down menu in a graphical user interface in response to an input (e.g., a mouse click). The drop-down menu can provide a set of menu items that can be managed by the user. Each menu item can correspond with a data component of a data set maintained in a database on a remote device, such as remote device 250 of FIG. 2. In certain embodiments, each data component can represent a device, system, network, or other entity. Further, each menu item can be configured to have a valid state and an invalid state, and each data item can be configured to have an accessible condition and an at least partially inaccessible condition. The valid state of a particular menu item can correspond to the accessible condition of a particular data component, and the invalid state of the menu item can correspond to the at least partially inaccessible condition of the particular data component. Opening the drop-down menu can further include accessing a database on a remote device to determine the current condition (e.g., status) of each data component, and displaying the menu items in the drop-down menu in the valid state or the invalid state depending on the condition of the data component corresponding to each menu item.

As an example, a user could input a command to open the drop-down menu. The drop-down menu could open vertically, and provide the user with a list of menu items. The menu items could, for instance, be a list of different computer systems on a local area network. Each menu item could indicate via a visual marker (e.g., text font, color, bold, italics, image) whether or not a particular computer system was currently in the valid state (i.e., currently online in the local area network) or in the invalid state (i.e., currently offline in the local area network.)

In certain embodiments, at block 306 the method 300 can include dynamically updating the set of menu items in the open drop-down menu in response to a change in the set of data. Consistent with various embodiments, dynamically updating the set of menu items can include a first transition, in which a particular data component converts from the at least partially inaccessible condition to the accessible condition, and a menu item corresponding to the particular data component converts from the invalid state to the valid state. Further, dynamically updating the set of menu items can include a second transition, in which a particular data component converts from the accessible condition to the at least partially inaccessible condition, and a menu item corresponding to the particular data component converts from the valid state to the invalid state.

Aspects of the present disclosure relate to dynamically updating the set of menu items in the drop-down menu in real-time while the drop-down menu is open, in response to a change in the set of data. For instance, referring to the example described above, a change in the set of data could occur when a computer system goes offline in the local area network. The data component representing that computer system can convert to the at least partially inaccessible condition, and the menu item corresponding to the data component can convert to the invalid state in real time while the drop-down menu is open.

Consistent with various embodiments, at block 308 the method 300 can include processing a selected item of the updated set of items in the opened drop-down menu. In certain embodiments, processing can include selecting a menu item from the set of menu items to perform a task, receive an update, or be utilized as part of an operation. For instance, referring again to the example described above, the name of a computer system displayed in the list of menu items could be selected in order to initiate a system update to that computer system. Consistent with various embodiments, valid menu items can be enabled for selection and processing in the drop-down menu, and invalid menu items can be disabled. However, aspects of the present disclosure relate to the recognition that, in certain situations, it may be desirable to select a menu item that is invalid at a certain time, in order that a task or operation be performed when that menu item becomes valid. Accordingly, in certain embodiments, an invalid menu item can be selected, and processing of the selected item can take place when the selected item becomes valid. For example, in order to initiate a system update to a computer system that is offline at a certain time, the menu item representing that computer system could be selected, and the computer system could receive the update at the time it comes online.

As an additional example, in certain embodiments, the menu items in the drop-down menu could be a list of bank accounts associated with an online banking transaction. In the event that the amount of money in a certain bank account drops below a threshold value, the menu item representing that bank account can become invalid. Similarly, if the amount of money in a certain bank account increases above a threshold value, the menu item representing that bank account can become valid. In certain embodiments, a user selecting a bank account to be used for automatic bill pay could select an invalid bank account (e.g., one that does not have sufficient funds to pay the bill), and in the event that that bank account becomes valid (e.g., funds are deposited), it could be used for the bill pay transaction. Other applications of the method 300 are also possible.

Aspects of the present disclosure are directed toward a method for managing a drop-down menu that can be configured to operate in three different modes. In a first mode (also referred to herein as a limited mode), the drop-down menu can display an abridged version of the menu items. In a second mode (also referred to herein as a moderate mode) the drop-down menu can display an expanded version of the menu items containing additional information. In a third mode (also referred to herein as a full mode) the drop-down menu can display a complete version of the menu items, providing detailed status information regarding the menu items and status changes. In certain embodiments, the mode of the drop-down menu can be selected by a user.

Figure 4:
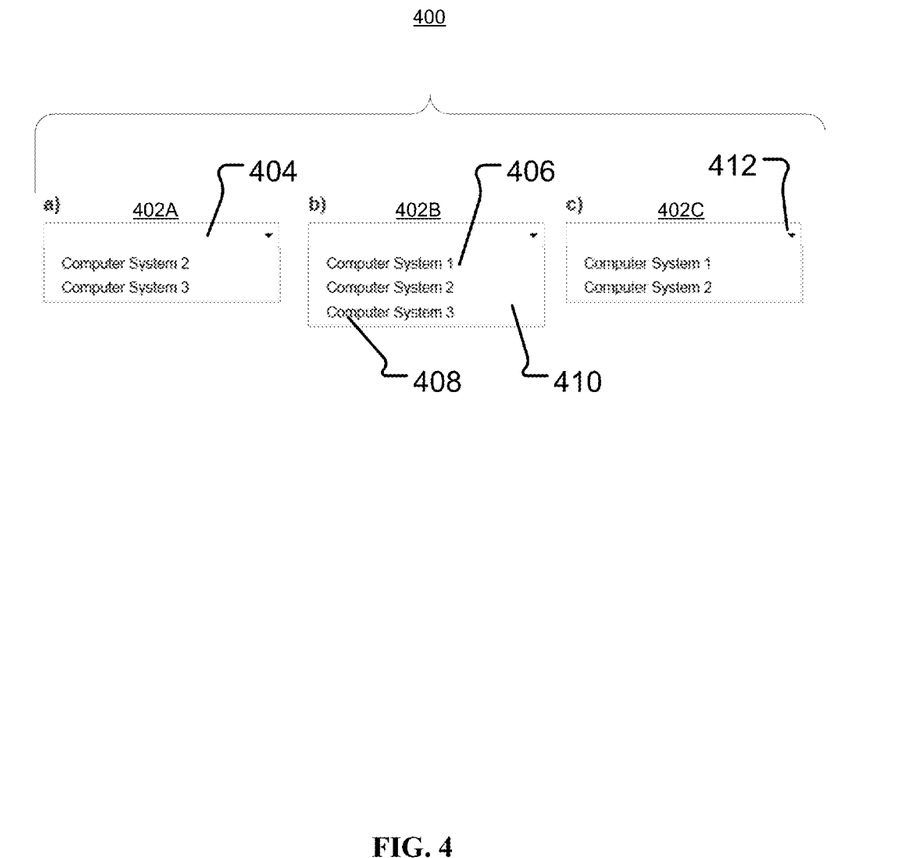
FIG. 4 illustrates a drop-down menu operating in a limited mode, according to embodiments.

FIG. 4 illustrates a drop-down menu 400 operating in a limited mode, consistent with various embodiments. Aspects of FIG. 4 are directed toward a drop-down menu 400 in a first phase 402A, a second phase 402B, and a third phase 402C. The drop-down menu 400 can undergo a first transition from the first phase 402A to the second phase 402B, and a second transition from the second phase 402B to the third phase 402C. Consistent with various embodiments, the drop-down menu 400 can include a menu pane 404, one or more menu items 406, 408, a selection window 410, and a drop-down arrow 412. As described herein, the menu elements can, for example be the names of computer systems on a local area network.

Consistent with various embodiments, when operating in the limited mode the drop-down menu 400 can display an abridged version of the menu items. When the drop-down menu 400 is initialized, (e.g., by a user clicking on the drop-down arrow 412), the selection window 410 can open vertically and display a list of available menu items. Consistent with various embodiments, in the limited mode, when the drop-down menu is initially opened, it can display the menu items that are currently in the valid state. In certain embodiments, the valid state can be indicated by displaying the menu items in a black font color.

When a menu item becomes valid (in response to a data component converting from the at least partially inaccessible condition to the accessible condition), it can be added to the list of menu items in the selection window 410 dynamically, while the selection window 410 is open. Further, when in the limited mode, when a menu item becomes invalid (in response to a data component converting from the at least partially inaccessible condition to the accessible condition), it can be removed from the list of menu items in the selection window 410 in real-time, while the selection window 410 is open. Consistent with various embodiments, a user may select one of the available menu items. In certain embodiments, the selecting the menu item can close the selection window 410, and the selected menu item can be displayed in the menu pane 404.

For example, as shown in FIG. 4, a user can initialize the drop-down menu 400 by clicking on the drop-down arrow 412. The selection window 410 can open, providing a list of valid menu items available at the time the selection window 410 opened, as shown in the first phase 402A. As described herein, in response to a change in a set of data on a database communicatively connected to the menu application (such as that of remote device 250 of FIG. 2), at the second phase 402B, a menu item 406 may become valid and can be dynamically added in real-time to the selection window 410 while the selection window 410 is open. At the third phase 402C, menu item 408 can become invalid, and can be dynamically removed from the selection window 410.

Figure 5:
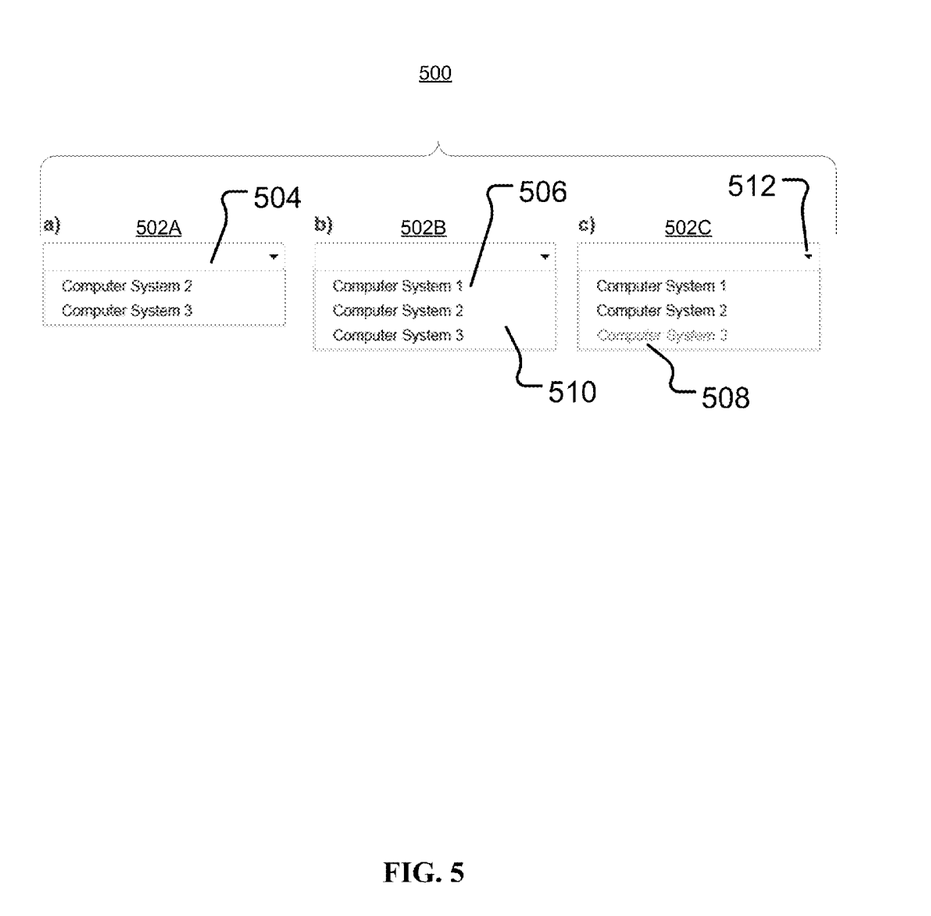
FIG. 5 illustrates a drop-down menu operating in a moderate mode, according to embodiments.

FIG. 5 illustrates a drop-down menu 500 operating in a moderate mode, consistent with various embodiments. Aspects of FIG. 5 are directed toward a drop-down menu 500 in a first phase 502A, a second phase 502B, and a third phase 502C. The drop-down menu 500 can undergo a first transition from the first phase 502A to the second phase 502B, and a second transition from the second phase 502B to the third phase 502C. Consistent with various embodiments, the drop-down menu 500 can include a menu pane 504, one or more menu items 506, 508, a selection window 510, and a drop-down arrow 512. As described herein, the menu elements can, for example be the names of computer systems on a local area network.

Consistent with various embodiments, when operating in the moderate mode the drop-down menu 500 can display an expanded version of the menu items containing additional information. When the drop-down menu 500 is initialized, (e.g., by a user clicking on the drop-down arrow 512), the selection window 510 can open vertically and display a list of available menu items. Consistent with various embodiments, in the moderate mode, when the drop-down menu is initially opened, it can display the menu items that are currently in the valid state. In certain embodiments, the valid state can be indicated by displaying the menu items in a black font color.

When a menu item becomes valid (in response to a data component converting from the at least partially inaccessible condition to the accessible condition), it can be added to the list of menu items in the selection window 510 dynamically, while the selection window 510 is open. In the moderate mode, when a menu item becomes invalid (in response to a data component converting from the at least partially inaccessible condition to the accessible condition), it can be disabled in the list of menu items in the selection window 510 in real-time, while the selection window 510 is open. A disabled menu item can remain in the drop-down menu 500, and can be unavailable for selection by a user. In certain embodiments, a disabled menu item can be marked with a visual indicator to signify its disabled status. Consistent with various embodiments, a user may select one of the remaining valid menu items. In certain embodiments, selecting the valid menu item can close the selection window 510, and the selected menu item can be displayed in the menu pane 504.

For example, as shown in FIG. 5, a user can initialize the drop-down menu 500 by clicking on the drop-down arrow 512. The selection window 510 can open, providing a list of valid menu items available at the time the selection window 510 opened, as shown in the first phase 502A. As described herein, in response to a change in a set of data on a database communicatively connected to the menu application (such as that of remote device 250 of FIG. 2), at the second phase 502B, a menu item 506 may become valid and can be dynamically added in real-time to the selection window 510 while the selection window 510 is open. At the third phase 502C, menu item 508 can become invalid, and can be dynamically disabled from the in the drop-down menu 500. Consistent with various embodiments, a disabled menu item can remain in the drop-down menu 500, and be unavailable for selection. As shown in FIG. 5, a disabled menu item can, for example, be displayed in italicized gray text to indicate that it is disabled.

In certain embodiments, the drop-down menu 500 can display additional information regarding the menu items in the selection window 510. For example, in response to the transition of a menu item from one validity state to another, a pop-up message can be displayed providing contextual information regarding the transition. In certain embodiments, the contextual information can include the time the transition took place, the cause of the transition, or other additional information. Consistent with various embodiments, the contextual information for a menu item can be provided in the form of a pop-up message triggered by a cursor hovering over a menu item. Additionally, in certain embodiments, a menu item that becomes valid can be displayed in bold font, or highlighted to indicate that it is now available.

Figure 6:
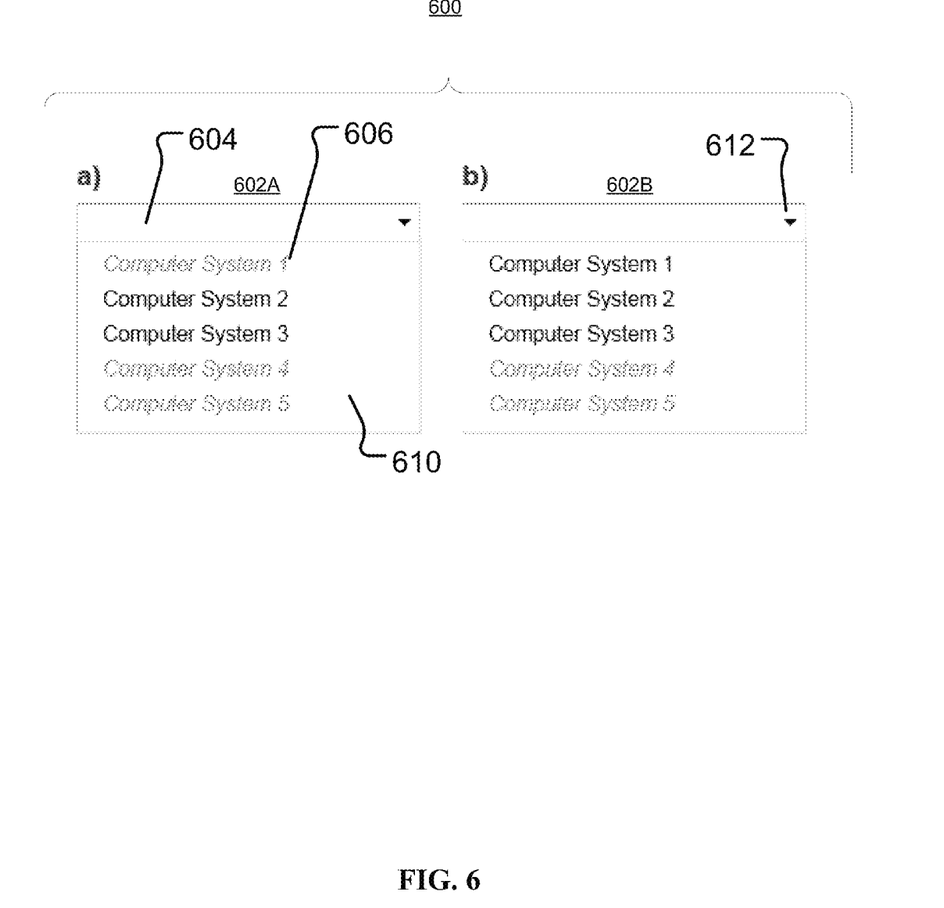
FIG. 6 illustrates a drop-down menu operating in a full mode, according to embodiments.

FIG. 6 illustrates a drop-down menu 600 operating in a full mode, consistent with various embodiments. Aspects of FIG. 6 are directed toward a drop-down menu 600 in a first phase 602A and a second phase 602B. The drop-down menu 600 can undergo a first transition from the first phase 602A to the second phase 602B. Consistent with various embodiments, the drop-down menu 600 can include a menu pane 604, one or more menu items 606, a selection window 610, and a drop-down arrow 612. As described herein, the menu elements can, for example be the names of computer systems on a local area network.

Consistent with various embodiments, when operating in the full mode the drop-down menu 600 can display a complete view of the menu items containing additional information. When the drop-down menu 600 is initialized, (e.g., via a selection by a user clicking on the drop-down arrow 612), the selection window 610 can open vertically and display a list of available menu items. Consistent with various embodiments, in the full mode, when the drop-down menu is initially opened, it can display both valid menu items and invalid menu items (i.e., the entire set of menu items). In certain embodiments, the valid state can be indicated by displaying the menu items in a black font color, and the invalid state can be indicated by disabling the menu items, and displaying them in a gray, italicized font.

When a menu item becomes valid (in response to a data component converting from the at least partially inaccessible condition to the accessible condition), it can be enabled in the list of menu items in the selection window 610 in real-time, while the selection window 610 is open. Enabling a menu item can include displaying a visual indicator (e.g., a font text or color), and making the disabled menu item available for selection in the selection window 610. In the full mode, when a menu item becomes invalid (in response to a data component converting from the at least partially inaccessible condition to the accessible condition), it can be disabled in the list of menu items in the selection window 610 in real-time, while the selection window 610 is open. Disabling a menu item can include displaying a visual indicator and making the enabled menu item unavailable for selection in the selection window 610.

As an example, a user could utilize drop-down menu 600 to select a computer system to receive a system update. The user can initialize the drop-down menu 600 by clicking on the drop-down arrow 612. The selection window 610 can open, providing a list of computer systems that could potentially receive the update. As shown in the first phase 602A, one or more computer systems can be invalid and disabled, indicated by italicized gray font. Consistent with certain embodiments, the disabled computer systems may be offline, or performing a task that prevents them from receiving the update. At the second phase 602B, a computer system could come online, and menu item 606 could become valid in the selection window 610, indicated by the black font. The user could then select menu item 606 to receive the system update.

Consistent with various embodiments, it may be desirable to select a menu item while it is disabled, in order to initiate a task or operation when the disabled menu item becomes enabled. For example, in certain embodiments, a user could select menu item 606 in the first phase 602A to initiate a system update to a computer system, and the update could begin in the second phase 602B when the menu item becomes valid.

In certain embodiments, the mode of the drop-down menu can be initiated via a selection by a user. For example, in certain embodiments, the drop-down menu could provide a "More Information" option or a "Less Information" option that would enable them to change the mode of the drop-down menu. In certain embodiments, the mode of the drop-down menu can be automatically determined by the computer implemented widget. The computer implemented widget can determine the mode of the drop-down menu based on a variety of factors relating to the number of menu items in the drop-down menu, the frequency with which the menu items change status, the type of information displayed, or other factors. For example, in certain embodiments, the computer implemented widget can determine the mode of the drop-down menu based on one or more threshold values of the number of menu items. Such a configuration can provide benefits associated with saving space within the user interface, and simplifying item management. For instance, a first threshold value could be 7, and a second threshold value could be 12. When the number of menu items is less than the 7, the drop-down menu can automatically be set in the full mode. When the number of menu items is greater than or equal to 7, but less than 12, the drop-down menu can automatically be set in the moderate mode. When the number of menu items is greater than or equal to 12, the drop-down menu can be automatically set in the limited mode.

Figure 7:
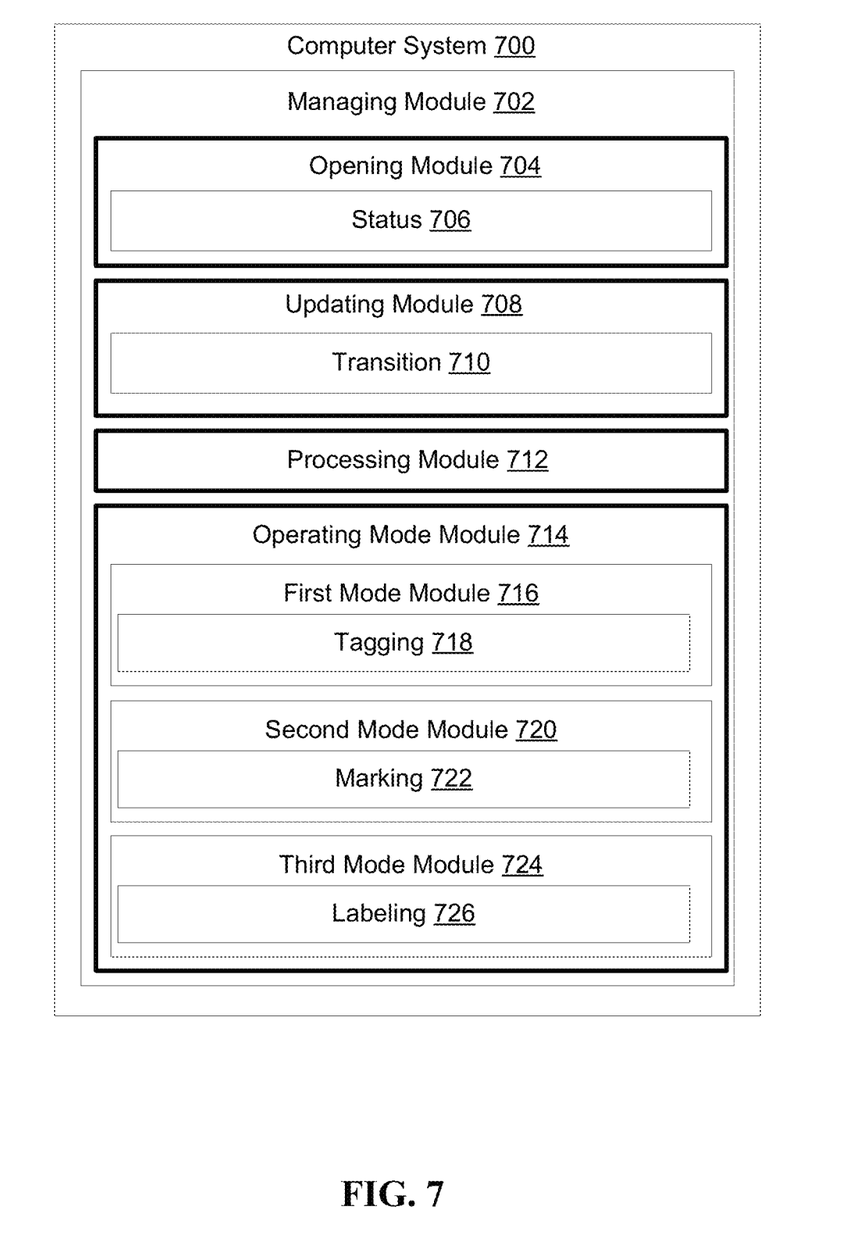
FIG. 7 illustrates modules of a system for managing a drop-down menu, according to embodiments.

FIG. 7 illustrates modules of a system for managing a drop-down menu, consistent with embodiments of the present disclosure. Consistent with various embodiments, method 300 can be implemented using one or more modules of FIG. 7. These modules can be implemented in hardware, software, or firmware executable on hardware, or a combination thereof. For example, these modules may be implemented on an exemplary computer system 700.

The computer system 700 can include a managing module 702. The managing module 702 can be configured and to manage a drop-down menu. The managing module 702 can include an opening module 704, a status module 706, an updating module 708, a transition module 710, a processing module 712, an operating mode module 714, a first mode module 716, a tagging module 718, a second mode module 720, a marking module 722, a third mode module 724, and a labeling module 726.

The opening module 714 can be configured to open a drop-down menu having a set of items corresponding with a set of data. In certain embodiments, the status module 706 can be configured to establish a relationship between the set of items and the set of data. Accordingly, the set of items can include first and second items configured to have first and second states. For example, the first state could be a valid state, and the second state could be an invalid state. The set of data may include first and second components configured to have first and second conditions. For example, the first condition may be an accessible condition, and the second condition may be an at least partially inaccessible condition. The first and second states of the first item can correspond to the first and second conditions of the first component, respectively. Additionally, the first and second states of the second item can correspond to the first and second conditions of the second component, respectively. For example, the valid state of the first item can correspond to the accessible condition of the first component. As an additional example, the invalid state of the second item can correspond to the at least partially inaccessible condition of the second component.

The updating module 708 can be configured to dynamically update the set of items in the drop-down menu in response to a change in the set of data. In certain embodiments, the transition module 710 can be configured to manage changes in the set of data. Accordingly, updating the set of items can include a first transition, in which the first component converts from the second condition to the first condition, and the first item converts from the second state to the first state. For example, the first component can convert from an at least partially inaccessible condition to an accessible condition, and the first item can convert from an invalid state to a valid state. Additionally, updating the set of items can include a second transition, in which the second component converts from the first condition to the second condition, and the second item converts from the first state to the second state. For example, the second component can convert from an accessible condition to an at least partially inaccessible condition, and the second item can convert from a valid state to an invalid state.

The processing module 712 can be configured to process a selected item from the updated set of items in the opened drop-down menu. Processing can include performing an operation related to a data component corresponding to the selected item. Further, processing can include choosing a data component corresponding to the selected item as the target of an operation. For example, a data component could represent a computer system, and processing could include selecting the item corresponding to the computer system in order to initiate a system update for the computer system.

The operating mode module 714 can be configured to manage the mode of the drop-down menu. Consistent with various embodiments, the first mode module 716 can be configured to facilitate operation of the drop-down menu in a first mode. In the first mode, the drop-down menu can be configured to provide a valid subset of a set of items in response to opening the drop-down-menu. Further, the method can include adding, in response to a first transition, a first item associated with the valid subset to the drop-down menu, and removing, in response to a second transition, a second item associated with an invalid subset from the drop-down menu. Consistent with various embodiments, the tagging module 718 can be configured to tag the first item with a data label having information regarding the first transition.

Consistent with various embodiments, the second mode module 720 can be configured to facilitate operation of the drop-down menu in a second mode. In the second mode, the drop-down menu can be configured to provide a valid subset of a set of items in response to opening the drop-down menu. Further, the method can include adding, in response to a first transition, a first item associated with the valid subset to the drop-down menu, and disabling, in response to a second transition, a second item of the drop-down menu. The second item may be associated with an invalid subset of the set of items. Consistent with various embodiments, the marking module 722 can mark disabled items with an indicator.

Consistent with various embodiments, the third mode module 724 can be configured to facilitate operation of the drop-down menu in a third mode. In the third mode, the drop-down menu can be configured to provide a valid subset of a set of items and an invalid subset of the set of items in response to opening the drop-down menu. Further, the method can include enabling, in response to a first transition, a first item of the drop-down menu, and disabling, in response to a second transition, a second item of the drop-down menu. The first item can be associated with the valid subset, and the second item can be associated with the invalid subset. Consistent with various embodiments, the labeling module 726 can be configured to mark the first item with a first data label and a first indicator in response to the first transition. The first data can include information related to the first transition. The labeling module 726 can also mark the second item with a second data label and a second indicator in response to the second transition. The second data label can include information related to the second transition.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for managing a widget for a drop-down menu in a graphical user interface, the method comprising:

opening the drop-down menu having an initial set of items corresponding with a set of data, the initial set of items including a list of valid menu items available when the drop-down menu is opened, wherein each menu item represents a respective computer resource which can be selected and utilized by a user as part of one or more task operations;

updating the list of valid menu items dynamically in real-time while the drop-down menu is open in response to a change in the set of data that occurs while the drop-down menu is open, wherein updating the list of valid menu items includes adding one or more menu items representing one or more respective computer resources, which have become available while the drop-down menu is open, to the list of valid menu items or disabling one or more menu items representing one or more respective computer resources, which have become unavailable while the drop-down menu is open, from the list of valid menu items while the drop-down menu is open; and processing, from the updated list of valid menu items, a selected menu item in the opened drop-down menu;

wherein disabling the one or more menu items includes providing a visual indicator to indicate that the one or more disabled menu items are invalid;

wherein adding one or more menu items to the list of valid menu items includes displaying contextual information in a pop-up message in response to a cursor hovering over a given one of the one or more menu items, wherein the contextual information includes at least one of a time the respective resource represented by the given one of the one or more menu items became available and a cause of the respective resource becoming available; and wherein processing the selected menu item in the opened drop-down menu comprises:

receiving user input indicating selection of one of the one or more disabled menu items;

in response to receiving user input indicating selection of the disabled menu item, determining when the respective computer resource corresponding to the selected disabled menu item becomes available; and in response to determining that the respective computer resource corresponding to the selected disabled menu item is available, executing a task operation utilizing the respective computer resource without receiving additional user input.

2. The method of claim 1, wherein the set of items corresponding with the set of data comprises:

the set of items including a first item configured to have a first state and a second state;

the set of items including a second item configured to have the first state and the second state;

the set of data including a first component configured to have a first condition and a second condition;

the set of data including a second component configured to have the first condition and the second condition;

the first state of the first item corresponding to the first condition of the first component;

the second state of the first item corresponding to the second condition of the first component;

the first state of the second item corresponding to the first condition of the second component; and the second state of the second item corresponding to the second condition of the second component.

3. The method of claim 2, wherein updating the set of items dynamically in the opened drop-down menu in response to a change in the set of data includes:

a first transition, wherein:

the first component converts from the second condition to the first condition, the first condition representing an accessible condition, the first item converts from the second state to the first state, the first state representing a valid state, and the first item is provided in the updated set of items; and a second transition, wherein:

the second component converts from the first condition to the second condition, the second condition representing an at least partially inaccessible condition, the second item converts from the first state to the second state, the first state representing an invalid state, and the second item is not provided in the updated set of items.

4. The method of claim 1, wherein the drop-down menu is configured to operate in a first mode, the first mode comprising:
- providing, in response to opening the drop-down menu, a valid subset of the set of items;
- adding, in response to a first transition, a first item to the drop-down menu, the first item associated with the valid subset; and
- removing, in response to a second transition, a second item from the drop-down menu, the second menu item associated with an invalid subset of the set of items.

5. The method of claim 4, further comprising tagging the first item with a data label having information regarding the first state change.

6. The method of claim 1, wherein the drop-down menu is configured to operate in a second mode, the second mode comprising:
- providing, in response to opening the drop-down menu, a valid subset of the set of items;
- adding, in response to a first transition, a first item to the drop-down menu, the first item associated with the valid subset; and
- disabling, in response to a second transition, a second item of the drop-down menu.

7. The method of claim 6, wherein disabling includes marking the second item with an indicator, the second item associated with an invalid subset of the set of items.

8. The method of claim 1, wherein the drop-down menu is configured to operate in a third mode, the third mode comprising:
- providing, in response to opening the drop-down menu, a valid subset of the set of items and an invalid subset of the set of items;
- enabling, in response to a first transition, a first item of the drop-down menu, the first item associated with the valid subset; and
- disabling, in response to a second transition, a second item of the drop-down menu, the second menu item associated with the invalid subset.

9. The method of claim 8, further comprising:
- marking, in response to the first transition, the first item with a first data label including information related to the first transition and a first indicator, the first item associated with the valid subset; and
- marking, in response to a second transition, the second item with a second data label including information related to the second transition and a second indicator, the second menu item associated with the valid subset.

10. A computer implemented method for managing a widget in a graphical user interface, the method comprising:
- opening the widget having an initial set of items corresponding with a set of data, the initial set of items including a list of valid menu items available when the widget is opened, the initial set of items corresponding with the set of data including:
  - a first item configured to have a first state and a second state; and
  - a second item configured to have the first state and the second state;
- the set of data including a first component configured to have a first condition and a second condition, wherein the first component is a computer resource that can be utilized by a user as part of one or more respective task operations;
- the set of data including a second component configured to have the first condition and the second condition, wherein the second component is a computer resource that can be utilized by the user as part of one or more respective task operations;
- the first state of the first item corresponding to the first condition of the first component;
- the second state of the first item corresponding to the second condition of the first component;
- the first state of the second item corresponding to the first condition of the second component;
- the second state of the second item corresponding to the second condition of the second component;
- updating the list of valid menu items dynamically in real-time while the widget is open in response to a change in the set of data that occurs while the widget is open, wherein updating the set of items includes:
  - a first transition, wherein:
    - the first component converts from the second condition to the first condition while the widget is open, the first condition representing an accessible condition and the second condition representing an at least partially inaccessible condition,
    - the first item converts from the second state to the first state while the widget is open, the first state representing a valid state, and
    - the first item is added to the list of valid menu items while the widget is open; and
  - a second transition, wherein:
    - the second component converts from the first condition to the second condition while the widget is open, the second condition representing an at least partially inaccessible condition and the first condition representing an accessible condition,
    - the second item converts from the first state to the second state while the widget is open, the first state representing an invalid state, and
    - the second item is disabled in the list of valid menu items while the widget is open and a visual indicator is provided indicating that the second item is invalid;
- processing, from the updated list of valid menu items, a selected item in the opened widget; and
- displaying respective contextual information in a pop-up message in response to a cursor hovering over the first item, wherein the contextual information includes at least one of a time the first component converted from the second condition to the first condition and a cause of the first component converting from the second condition to the first condition;
- wherein processing the selected item in the opened widget comprises:
  - receiving user input indicating selection of the second item while the second item is disabled in the list of valid menu items;
  - in response to receiving user input indicating selection of the second item while the second item is disabled, monitoring the second component to determine when the second component transitions from the second condition to the first condition; and
  - in response to determining that the second component transitions to the first condition, executing a task operation utilizing the second component without receiving additional user input.

11. The method of claim 10, wherein the widget is configured to operate in a first mode if the number of items in the set of items is greater than or equal to a first threshold value, a second mode if the number of items in the set of items is less than the first threshold value and greater than or equal to a second threshold value, and a third mode if the number of items in the set of items is less than the second threshold value, the first mode comprising:
  providing, in response to opening the drop-down menu, a valid subset of the set of items,
  adding, in response to a first transition, a first item to the drop-down menu, the first item associated with the valid subset,
  removing, in response to a second transition, a second item from the drop-down menu, the second menu item associated with an invalid subset of the set of items, and
  tagging the first item with a data label having information regarding the first state change;
the second mode comprising:
  providing, in response to opening the drop-down menu, a valid subset of the set of items,
  adding, in response to a first transition, a first item to the drop-down menu, the first item associated with the valid subset, and
  disabling, in response to a second transition, a second item of the drop-down menu, wherein disabling includes marking the second item with an indicator; and
the third mode comprising:
  providing, in response to opening the drop-down menu, a valid subset of the set of items and an invalid subset of the set of items,
  enabling, in response to a first transition, a first item of the drop-down menu, the first item associated with the valid subset,
  disabling, in response to a second transition, a second item of the drop-down menu, the second menu item associated with the invalid subset,
  marking, in response to the first transition, the first item with a first data label including information related to the first transition and a first indicator, the first item associated with the valid subset, and
  marking, in response to a second transition, the second item with a second data label including information related to the second transition and a second indicator, the second menu item associated with a the valid subset.

12. A system for managing a widget for a drop-down menu in a graphical user interface, the system comprising:
  a computer monitor configured to display the drop-down menu in the graphical user interface;
  an input device configured to receive user input; and
  a processing unit communicatively coupled to the computer monitor and the input device;
  wherein the processing unit is configured to:
    output commands to the computer monitor to open the drop-down menu in response to user input received via the input device, the drop-down menu having an initial set of items corresponding with a set of data the initial set of items including a list of valid menu items available when the drop-down menu is opened, wherein each menu item represents a respective computer resource which can be selected and utilized by a user as part of one or more task operations;
    update the list of valid menu items dynamically in real-time while the drop-down menu is open in response to a change in the set of data that occurs while the drop-down menu is open, wherein updating the list of valid menu items includes adding one or more menu items representing one or more respective computer resources, which have become available while the drop-down menu is open, to the list of valid menu items or disabling one or more menu items representing one or more respective computer resources, which have become unavailable while the drop-down menu is open, from the list of valid menu items while the drop-down menu is open; and
    process, from the updated list of valid menu items, a selected menu item in the opened drop-down menu;
    wherein disabling the one or more menu items includes providing a visual indicator to indicate that the one or more disabled menu items are invalid;
    wherein adding one or more menu items to the list of valid menu items includes displaying contextual information in a pop-up message in response to a cursor hovering over a given one of the one or more menu items, wherein the contextual information includes at least one of a time the respective resource represented by the given one of the one or more menu items became available and a cause of the respective resource becoming available; and
    wherein the processing unit is configured to process the selected menu item in the opened drop-down menu by:
      receiving user input indicating selection of one of the one or more disabled menu items;
      in response to receiving user input indicating selection of the disabled menu item, determining when the respective computer resource corresponding to the selected disabled menu item becomes available; and
      in response to determining that the respective computer resource corresponding to the selected disabled menu item is available, executing a task operation utilizing the respective computer resource without receiving additional user input.

13. The system of claim 12, wherein the set of items corresponding with the set of data comprises:
  the set of items including a first item configured to have a first state and a second state;
  the set of items including a second item configured to have the first state and the second state;
  the set of data including a first component configured to have a first condition and a second condition;
  the set of data including a second component configured to have the first condition and the second condition;
  the first state of the first item corresponding to the first condition of the first component;
  the second state of the first item corresponding to the second condition of the first component;
  the first state of the second item corresponding to the first condition of the second component; and
  the second state of the second item corresponding to the second condition of the second component.

14. The system of claim 13, wherein the processing unit configured to update the list of valid menu items dynamically in real-time while the drop-down menu is open in response to a change in the set of data includes:
  a first transition, wherein:
    the first component converts from the second condition to the first condition, the first condition representing an accessible condition,
    the first item converts from the second state to the first state, the first state representing a valid state, and
    the first item is provided in the updated set of items; and
  a second transition, wherein:
    the second component converts from the first condition to the second condition, the second condition representing an at least partially inaccessible condition, the second item converts from the first state to the second state, the first state representing an invalid state, and the second item is not provided in the updated set of items.

15. The system of claim 12, wherein the processing unit is configured to operate in a first mode to:
provide, in response to opening the drop-down menu, a valid subset of the set of items;
add, in response to a first transition, a first item to the drop-down menu, the first item associated with the valid subset; and
remove, in response to a second transition, a second item from the drop-down menu, the second menu item associated with an invalid subset of the set of items.

16. The system of claim 15, wherein the processing unit is further configured to tag the first item with a data label having information regarding the first state change.

17. The system of claim 12, wherein the processing unit is configured to operate in a second mode to:
provide, in response to opening the drop-down menu, a valid subset of the set of items;
add, in response to a first transition, a first item to the drop-down menu, the first item associated with the valid subset; and
disable, in response to a second transition, a second item of the drop-down menu.

18. The system of claim 17, wherein disabling includes marking the second item with an indicator, the second item associated with an invalid subset of the set of items.

19. The system of claim 12, wherein the processing unit is configured to operate in a third mode to:
provide, in response to opening the drop-down menu, a valid subset of the set of items and an invalid subset of the set of items;
enable, in response to a first transition, a first item of the drop-down menu, the first item associated with the valid subset; and
disable, in response to a second transition, a second item of the drop-down menu, the second menu item associated with the invalid subset.

20. The system of claim 19, wherein the processing unit is further configured to:
mark, in response to the first transition, the first item with a first data label including information related to the first transition and a first indicator, the first item associated with the valid subset; and
mark, in response to a second transition, the second item with a second data label including information related to the second transition and a second indicator, the second menu item associated with the valid subset.

* * * * *